United States Patent [19]

Hirose

[11] Patent Number: 4,554,444

[45] Date of Patent: * Nov. 19, 1985

[54] AUTOMATIC BANK NOTE TRANSACTION APPARATUS

[75] Inventor: Minoru Hirose, Yokohama, Japan

[73] Assignee: Kabushiki Kaisha Toshiba, Kawasaki, Japan

[ * ] Notice: The portion of the term of this patent subsequent to Oct. 23, 2001 has been disclaimed.

[21] Appl. No.: 580,731

[22] Filed: Feb. 16, 1984

Related U.S. Application Data

[62] Division of Ser. No. 337,244, Jan. 5, 1982, Pat. No. 4,479,049.

[30] Foreign Application Priority Data

| | | | |
|---|---|---|---|
| Jan. 22, 1981 | [JP] | Japan | 56-8514 |
| Jan. 22, 1981 | [JP] | Japan | 56-8525 |
| Apr. 6, 1981 | [JP] | Japan | 56-51538 |

[51] Int. Cl.⁴ ............ G06F 15/30

[52] U.S. Cl. ............ 235/379; 209/534; 194/DIG. 26

[58] Field of Search ............ 194/DIG. 26; 235/379, 235/380, 381, 382, 385; 209/534

[56] References Cited

U.S. PATENT DOCUMENTS

| | | | |
|---|---|---|---|
| 2,792,148 | 5/1957 | Goldenberg . | |
| 3,211,268 | 10/1965 | Dills et al. . | |
| 3,445,633 | 5/1969 | Ratner . | |
| 3,447,655 | 6/1969 | Tanaka et al. | 194/DIG. 26 |
| 3,644,713 | 2/1972 | Hayakawa et al. . | |
| 3,648,020 | 3/1972 | Tateisi et al. . | |
| 3,731,799 | 5/1983 | Meloni et al. . | |
| 3,760,158 | 9/1973 | Whitehead et al. . | |
| 3,765,523 | 10/1973 | Nakanishi . | |
| 3,783,989 | 1/1974 | Jensen . | |
| 3,800,155 | 3/1974 | Potenza . | |
| 3,826,344 | 7/1974 | Wahlberg | 194/DIG. 26 |
| 3,862,716 | 1/1975 | Black et al. . | |
| 3,888,267 | 6/1975 | Gautschi . | |
| 3,917,260 | 11/1975 | Okkonen et al. . | |
| 3,934,693 | 1/1976 | Ooyama et al. . | |
| 3,937,925 | 2/1976 | Boothroyd . | |
| 3,943,335 | 3/1976 | Kinker et al. . | |
| 3,966,947 | 6/1976 | Steiner . | |
| 3,988,571 | 10/1976 | Blair et al. | 235/379 |
| 4,011,931 | 3/1977 | Wyckoff . | |
| 4,017,004 | 4/1977 | Onoe et al. . | |
| 4,020,972 | 5/1977 | Lundblad . | |
| 4,023,011 | 5/1977 | Nakajima et al. | 235/478 |
| 4,096,991 | 6/1978 | Iguchi . | |
| 4,109,238 | 8/1978 | Creekman . | |
| 4,159,782 | 7/1979 | Swartzendruber . | |
| 4,199,100 | 4/1980 | Wostl et al. . | |
| 4,283,708 | 8/1981 | Lee . | |
| 4,363,584 | 12/1982 | Kokubo | 414/33 |
| 4,365,700 | 12/1982 | Arimoto et al. | 194/2 |

FOREIGN PATENT DOCUMENTS

| | | | |
|---|---|---|---|
| 24704 | 11/1981 | European Pat. Off. . | |
| 541697 | 1/1979 | Japan | 194/DIG. 26 |
| 2205106 | of 0000 | United Kingdom . | |
| 1047056 | 11/1966 | United Kingdom . | |
| 1300848 | 12/1972 | United Kingdom . | |
| 1370972 | 10/1974 | United Kingdom . | |
| 1481425 | 7/1977 | United Kingdom . | |
| 1518995 | 7/1978 | United Kingdom . | |
| 2094531 | 9/1982 | United Kingdom . | |

*Primary Examiner*—Gene Z. Rubinson
*Assistant Examiner*—Robert Lev
*Attorney, Agent, or Firm*—Cushman, Darby & Cushman

[57] ABSTRACT

An automatic bank note transaction apparatus comprises a bank note receiving section disposed opposite to a cash inlet/outlet slot inside a housing to receive bank notes collectively put in the housing through the cash inlet/outlet slot. A conveyance path successively introduces and conveys the bank notes received in the bank note receiving section one by one to a discriminator which detects the denomination of the bank notes introduced and conveyed by the conveyance path. Distributing gates sort the bank notes by denomination according to the result of the discrimination by the discriminator into temporary collecting sections. The notes may then be transferred to safe sections provided for the several denominations. Apparatus is provided for retrieving notes from the safe sections for withdrawal by a user. Thus, the deposited notes which are transferred to the safe sections are added to notes which may be used for withdrawal.

12 Claims, 21 Drawing Figures

AUTOMATIC BANK NOTE TRANSACTION APPARATUS

This is a division of application Ser. No. 337,244, filed Jan. 5, 1982, which issued on Oct. 23, 1984 as U.S. Pat. No. 4,479,049.

BACKGROUND OF THE INVENTION

This invention relates to an automatic bank note transaction apparatus such as an automatic depositing-/withdrawing machine, more specifically to an automatic bank note transaction apparatus provided with both a depositing function and a withdrawing function.

Automatic bank note transaction apparatus, such as automatic depositing/withdrawing machines, have recently been developed and put to practical use to achieve reduction of labor for service at the window in banks.

In the prior art apparatus of this type, however, bank notes previously stored in a safe for withdrawal are used for withdrawal, and deposited bank notes are stored in a safe for depositing separate from the withdrawal safe. In one such apparatus in operation, therefore, thousands of bank notes for each denomination need be reserved exclusively for withdrawal, and the number of deposited bank notes may reach several thousands for each denomination. For the bank concerned, this means that a great number of bank notes are unnecessarily left unutilized in the apparatus during the operation thereof. Thus, with the prior art apparatus, the coefficient of utilization of bank notes is extremely low, and the setting and rearrangement of bank notes at the start and end of the operation produce a heavy work load.

SUMMARY OF THE INVENTION

This invention is contrived in consideration of these circumstances, and is intended to provide an automatic bank note transaction apparatus capable of using deposited bank notes as bank notes for withdrawal, thereby minimizing the total number of bank notes stored in the apparatus to improve the coefficient of utilization of bank notes and to relieve the work load attributed to the storage and rearrangement of bank notes at the start and end of operation.

According to an aspect of the invention, there is provided an automatic bank note transaction apparatus which comprises a housing having a cash inlet and a cash outlet, a bank note receiving section disposed opposite to the cash inlet inside the housing to receive bank notes collectively put in the apparatus through the cash inlet, conveyance means for successively introducing and conveying the bank notes received in the bank note receiving section one by one, first discriminating means for discriminating the denomination of the bank notes introduced and conveyed by the conveyance means, first distributing means for sorting the bank notes by denomination according to the result of the discrimination by the first discriminating means, a plurality of temporary collecting sections for separately depositing notes of several denominations, whereby the bank notes sorted out by the first distributing means are temporarily collected according to their respective denominations, a plurality of first safe sections provided for the several denominations in which bank notes for withdrawal are previously stored in bank note storage chambers so that the stored bank notes may be taken out one by one, second discriminating means for discriminating fit notes from unfit notes among the bank notes for withdrawal taken out from the first safe sections, second distributing means for sorting the bank notes for withdrawal according to the result of the discrimination by the second discriminating means, temporary collecting sections for fit notes for withdrawal, whereby the fit notes among the bank notes for withdrawal sorted out by the second distributing means are collected temporarily, conveyance means for conveying the bank notes for withdrawal collected in the temporary collecting section for withdrawal to the cash outlet, and transfer means for transferring the deposited bank notes collected in the temporary collecting sections for depositing to the bank note storage chambers of the first safe sections in which bank notes for withdrawal of the same denominations as those of the deposited bank notes are stored, severally, whereby the deposited bank notes are used as bank notes for withdrawal.

DETAILED DESCRIPTION OF THE PREFERRED EMBODIMENTS

Now there will be described in detail an automatic bank note transaction apparatus according to a first embodiment of this invention with reference to the accompanying drawings of FIGS. 1 to 10.

Figure 1:
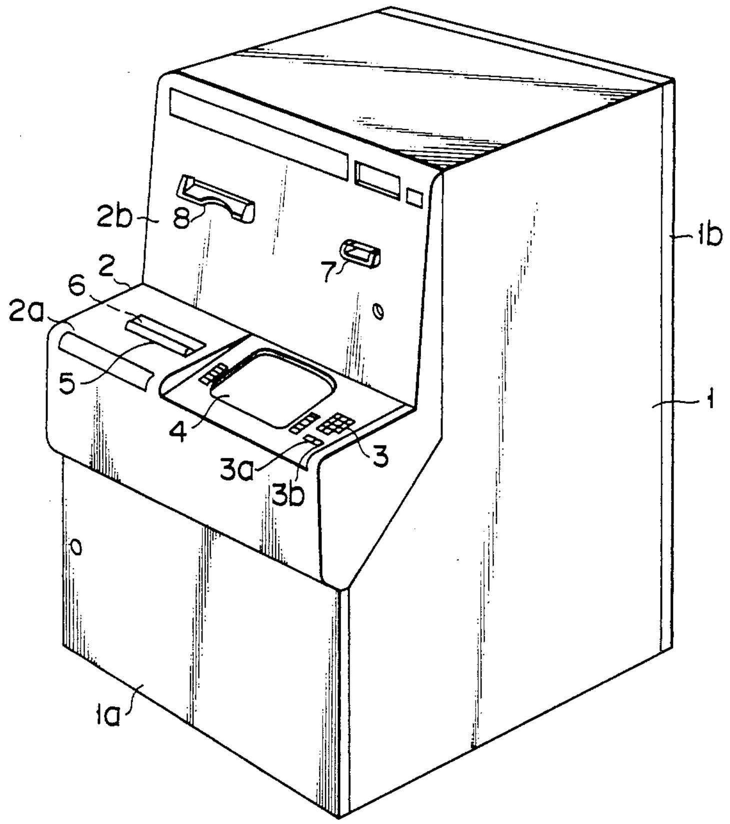
FIG. 1 is a general perspective view of a first embodiment of an automatic bank note transaction according to the present invention.

In FIG. 1, numeral 1 designates a housing of an automatic depositing/withdrawing machine as the automatic bank note transaction apparatus. Formed on the front side of the housing 1 is a user-service section 2 which includes a horizontal control board 2*a* located substantially halfway between the top and bottom of the housing 1, and a vertical control board 2*b* rising from the rear edge of the horizontal control board 2*a*. Arranged on the horizontal control board 2*a* are a keyboard 3, a CRT display unit 4, and a cash inlet/outlet slot 6 serving both as a cash inlet and a cash outlet and opened and closed by the slide of a cover 5. Arranged on the vertical control board 2*b*, on the other hand, are a card inlet slot 7 and a passbook inlet slot 8. The keyboard 3 is provided with an approval key 3*a* and a disapproval key 3*b*.

Further, the housing 1 contains therein a card reader (not shown) for reading information on an ID card inserted through the card inlet slot 7, a passbook reader-printer (not shown) for reading a magnetic stripe on a passbook inserted through the passbook inlet slot 8 and recording transaction details on the passbook, and a depositing/withdrawing mechanism 9 for deposit and withdrawal.

Figure 2:
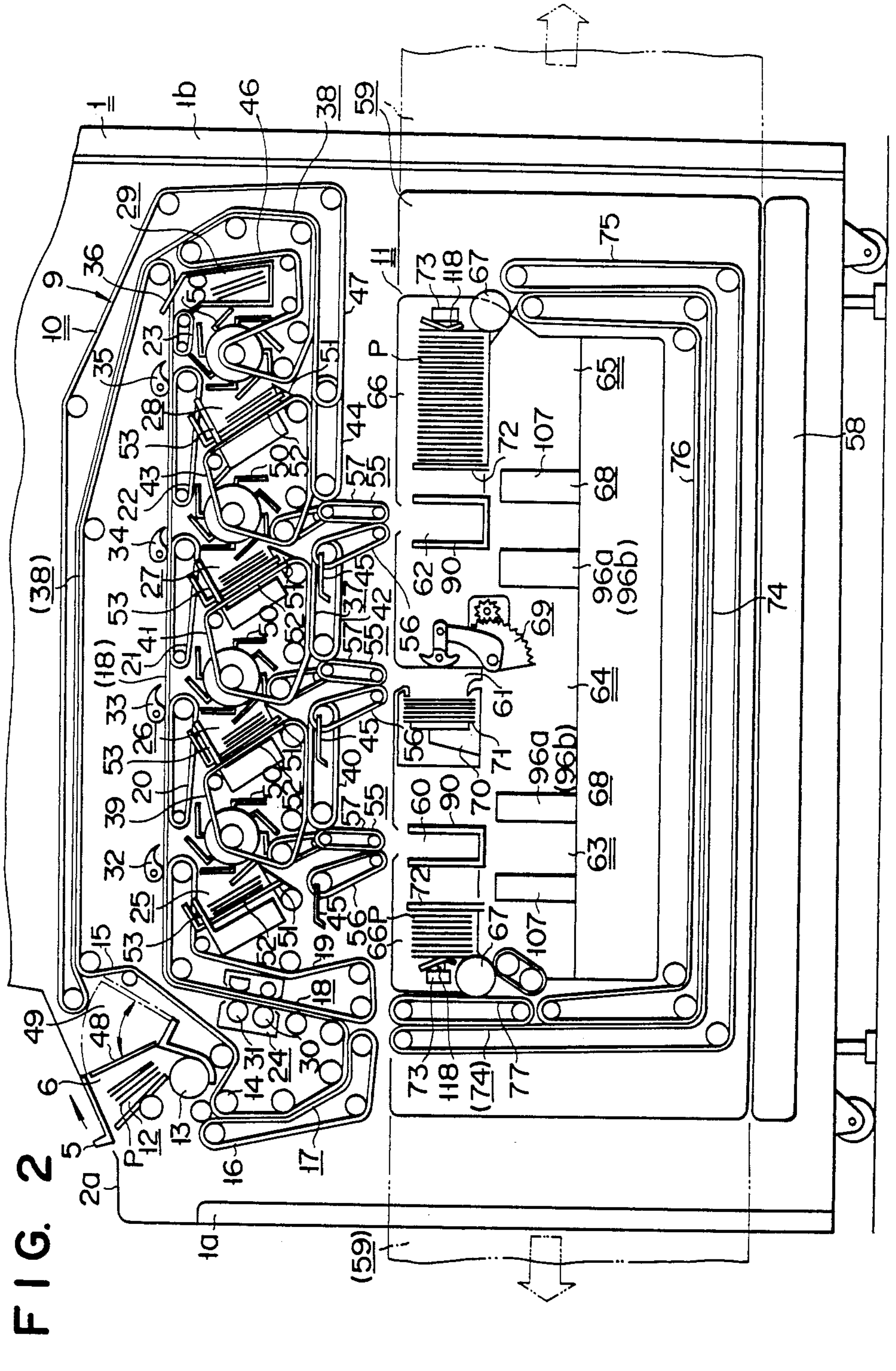
FIG. 2 is a partially broken, enlarged profile of the apparatus shown in FIG. 1.

As shown in FIG. 2, the depositing/withdrawing mechanism 9 mainly includes a bank note processing section 10 and a safe unit section 11 which are disposed in the upper and lower portions of the interior of the housing 1.

The bank note processing section 10 is constructed as follows. A bank note receiving section 12 is disposed opposite to the cash inlet/outlet slot 6. The bottom surface of the bank note receiving section 12 is declined toward the outer side (left-hand side of FIG. 2). An introduction roller 13 is disposed on the bottom surface at the lower end side thereof. A bank note P located in the outermost part of the bank note receiving section 12 is introduced diagonally downward. Then, the introduced bank note P is delivered into a first conveyance path 18 by means of a pair of transfer rollers 14 and an introduction conveyance path 17 defined by the facing portions of first and second endless conveyor belts 15 and 16. The first conveyance path 18 is defined by facing portions between the first endless conveyor belt 15 and third, fourth, fifth, sixth and seventh endless conveyor belts 19, 20, 21, 22 and 23 parts of which are in contact with the under surfaces of the rising portion and horizontal portion of the first endless belt 15. A bank note discriminator 24 is disposed at the rising portion of the first conveyance path 18 on the starting end side thereof. A first temporary collecting section 25 for first-denomination notes Pa (e.g., 10-dollar or 1-pound notes), a second temporary collecting section 26 for second-denomination notes Pb (e.g., 1- and 50-dollar notes or 5- and 20-pound notes), a third temporary collecting section 27 for third-denomination notes Pc (e.g., 100-dollar or 10-pound notes), a fourth temporary collecting section 28 for withdrawal, and a collecting box 29 are successively arranged under the horizontal portion of the first conveyance path 18. The bank note discriminator 24 includes a thickness detecting section 30, a magnetism detecting section 31, and a width/length detecting section (not shown).

Disposed along the horizontal portion of the first conveyance path 18 are first, second, third and fourth distributing gates 32, 33, 34 and 35 for selectively leading bank notes P passed through the bank note discriminator 24 into the first to fourth temporary collecting sections 25 to 28 according to the denomination, and a guide plate 36 for leading into the box 29 the bank notes P having reached the terminal end of the first conveyance path 18.

Further, a return path 37 is formed along the under sides of the temporary collecting sections 25, 26, 27 and 28. The terminal end portion of the return path 37 is connected with the starting end portion of a second conveyance path 38. The second conveyance path 38 rises to embrace the back of the box 29, and then extends to the front side so that its terminal end portion is located diagonally above the bank note receiving section 12.

The return path 37 is defined by facing portions between eighth and ninth endless conveyor belts 39 and 40, between tenth and eleventh endless conveyor belts 41 and 42, and between twelfth and thirteenth endless conveyor belts 43 and 44, and by the respective top surfaces of shutters 45 severally facing the outlets of the first, second and third temporary collecting sections 25, 26 and 27. As for the second conveyance path 38, it is defined by facing portions between fourteenth and fifteenth endless conveyor belts 46 and 47, and between the first and fifteenth endless conveyor belts 15 and 47.

Near the terminal end of the second conveyance path 38, that is, at the back of the bank note receiving section 12, is defined a temporary receiving section which once receives the bank notes P delivered from the second conveyance path 38 in a somewhat inclined vertical position, and then delivers them to the bank note receiving section 12 accompanying the displacement of a movable plate 48.

The temporary collecting sections 25, 26, 27 and 28 each include an impeller 50, a gate 51 doubling as a bearer to support the lower edges of the bank notes P supplied successively by means of the impeller 50, a guide plate 52 maintaining the bank notes P supported by the gate 51 in a substantially upright position, and a depressing plate 53 telescopically attached to the guide plate 52 substantially at right angles to the guide surface thereof, whereby the upper edges of the collected bank notes P are pressed down when the gate 51 is opened. Further, the temporary collecting sections 25, 26, 27 and 28 are provided with a line-up device 54 (mentioned later with reference to FIGS. 3 and 4) for truing up both end edges of piles of bank notes P stacked severally in the collecting sections.

In the positions to face the respective outlets of the first, second and third temporary collecting sections 25, 26 and 27, there are arranged delivery mechanisms 55 which deliver the temporarily collected bank notes P to the safe unit section 11 disposed in the lower portion of the interior of the housing 1. The delivery mechanisms 55 are each composed of a support belt 56 and a pressure belt 57 capable of engaging and being disengaged from the support belt 56. The delivery mechanisms 55 deliver the bank notes P as they are held in bundles.

Now there will be described the construction of the safe unit section 11. A drawer rail 58 is laid on the bottom of the housing 1. On the drawer rail 58 lies a safe unit 59 which can slide longitudinally on the rail 58. The safe unit 59 can be drawn out to the front side of the housing 1 by opening a front door 1*a* of the housing 1, and to the back side by opening a back door 1*b*.

The safe unit 59 is constructed as follows. First, second and third safe sections 63, 64 and 65 are arranged with their respective openings 60, 61 and 62 opposed severally to the delivery mechanisms 55 in the bank note processing section 10. The first safe section 63 is so constructed that the bank notes P in a bank note storage chamber 66 can successively be taken out one by one by means of a takeout roller 67 as a takeout device, and that the bank notes P in the inlet 60 delivered thereto by the delivery mechanism 55 can be transferred to the bank note storage chamber 66 by means of a transfer device 68 (mentioned later with reference to FIGS. 5 and 6) to be used for withdrawal. The third safe section 65 has the same construction as that of the first safe section 63. As for the second safe section 64 corresponding to the second temporary collecting section 26, it is so constructed that a pile of bank notes P in the inlet 61 are simply pushed into a bank note storage chamber 71 by means of a push mechanism 69 against the urging force of a backup member 70.

In each of the first and third safe sections 63 and 65, moreover, the bank notes P in the bank note storage chamber 66 are pushed toward the takeout side by a backup member 72 so that an accumulated pressure suited for takeout may be obtained at any time. Numeral 73 designates a detection switch for detecting the takeout pressure.

Further, the safe unit 59 is provided with a supply-conveyance path 74 whereby the bank notes P taken out from the first and third safe sections 63 and 65 are led into the first conveyance path 18 of the bank note processing section 10. The supply-conveyance path 74 is defined between facing portions of a sixteenth endless conveyor belt 75 stretched along the back, bottom and front of the safe unit 59, and seventeenth and eighteenth endless conveyor belts 76 and 77 parts of which are in contact with the sixteenth endless belt 75.

Figure 3:
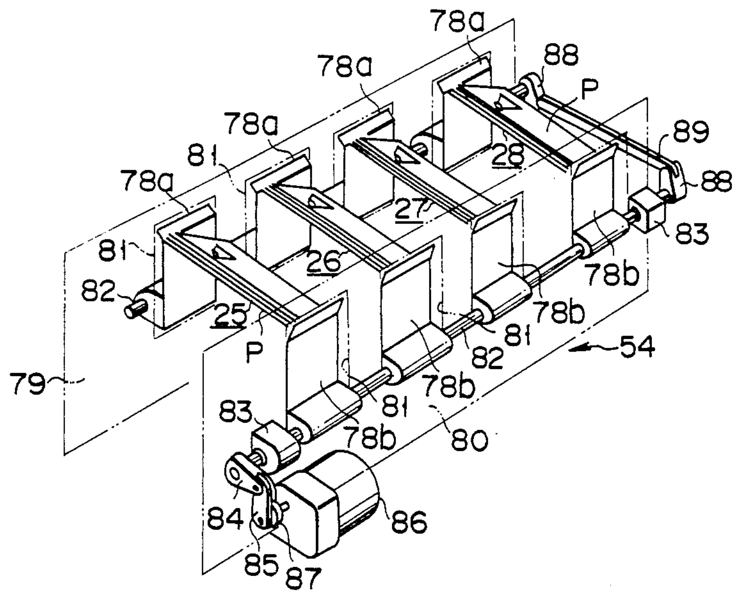
FIG. 3 is a perspective view of a line-up device used in the apparatus.
Figure 4:
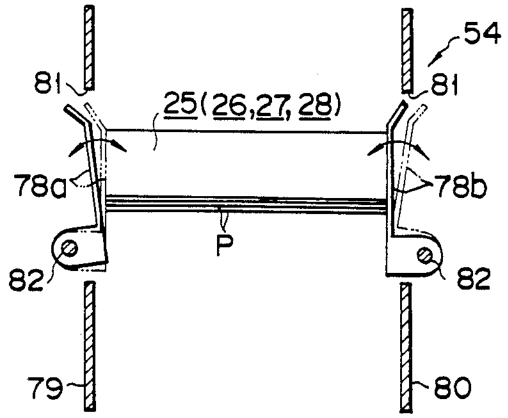
FIG. 4 is a sectional view of the line-up device shown in FIG. 3.
Figure 5:
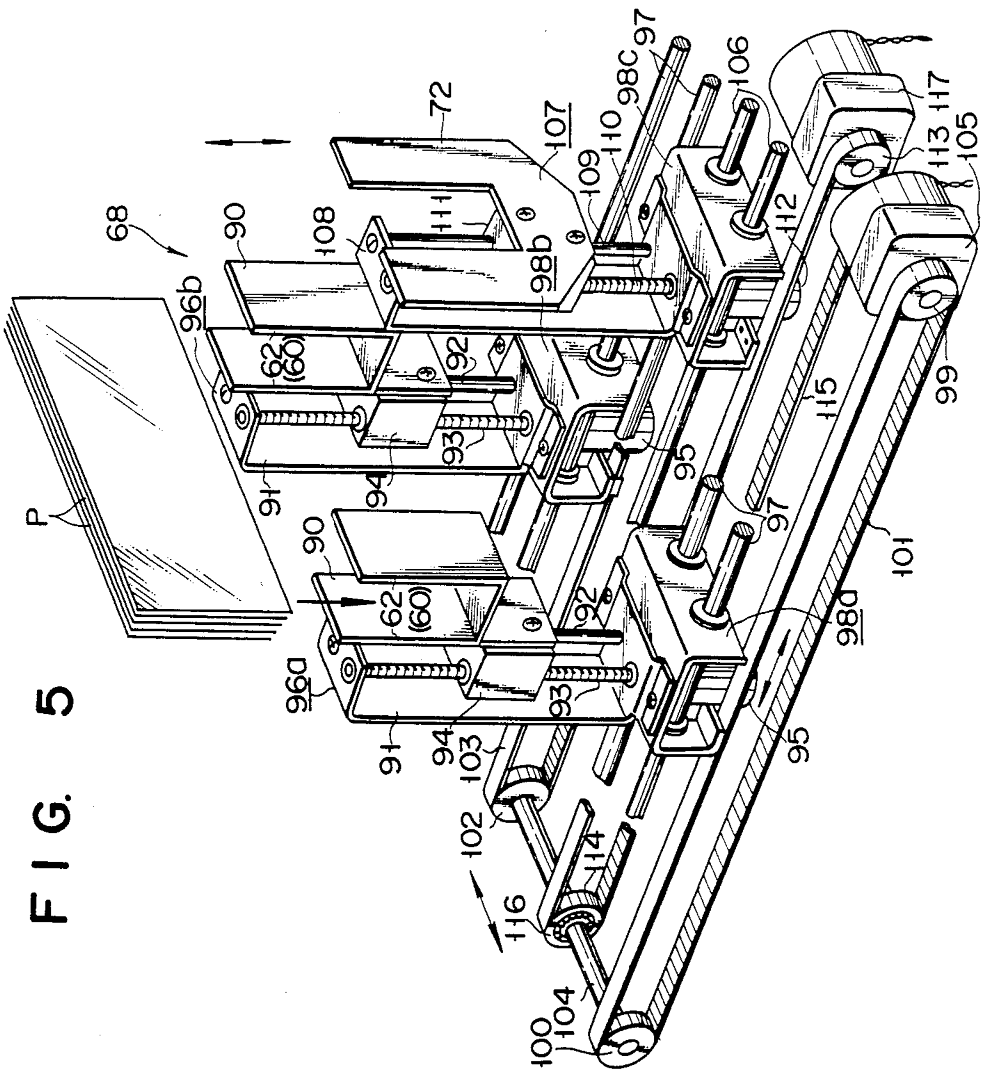
FIG. 5 is a perspective view of a transfer device used in the apparatus.

Referring now to FIGS. 3 and 4, there will be described the line-up device 54 for truing up the edges of a pile of bank notes P collected in the temporary collecting sections 25, 26, 27 and 28 of the bank note processing section 10. The bank notes P are stacked in a slanted position in the temporary collecting sections 25, 26, 27 and 28 with their longer edges downward. In each of the temporary collecting sections 25, 26, 27 and 28, a pair of line-up plates 78*a* and 78*b* are arranged opposite to the shorter edges of the bank notes P at both ends thereof. These pairs of line-up plates 78*a* and 78*b* severally face the temporary collecting sections 25, 26, 27 and 28 across open windows 81 formed in both left and right frames 79 and 80—four windows in each frame. The lower end portions of the line-up plates 78*a* and 78*b* are fixed on a pair of shafts 82. Each shaft 82 is rockably supported by a pair of bearing devices 83 at either end portion. The shafts 82 are repeatedly rocked in both clockwise and counterclockwise directions by a mechanism mentioned later, thereby causing the line-up plates 78*a* and 78*b* to swing in either direction. An arm 84 is mounted on one end portion of one of the shafts 82. The distal end of the arm 84 is coupled with the eccentric rotating portion of an eccentric cam 87 which is rotated by a motor 86 as a driving source. Thus, the rotatory motion of the motor 86 is converted into repeated rocking motion of the shaft 82. Further, arms 88 extending in opposite directions are attached to the respective rear ends of the two shafts 82. The distal ends of the arms 88 are coupled by means of a coupling rod 89. Thus, the repeated rocking motion of the one shaft 82 is transmitted to the other shaft 82 to rock the same simultaneously. As shown in FIG. 4, therefore, the line-up plates 78*a* and 78*b* are simultaneously swung in the same direction by the drive of the eccentric cam 87 by the motor 86, and thus the shorter edges of the bank notes P stacked in the temporary collecting sections 25, 26, 27 and 28 can be trued up.

Referring further to FIGS. 5 and 6A to 6F, there will be described the construction and operation of the transfer devices 68 for transferring the introduced bank notes P through the inlets 60 and 62 to bank note storage chambers 66 for withdrawal. The transfer devices 68 at the first and third safe sections 63 and 65 are of the same construction except the direction. Therefore, only the transfer device 68 on the side of the third safe section 65 will be described herein. Bank note holding mechanisms 96*a* and 96*b*, which vertically receive the bank notes P delivered in bundles by the delivery mechanism 55, have their respective inlets 62. These inlets 62 are formed of a pair of U-shaped receiving members 90 to support both shorter edge portions of a pile of bank notes P, severally. Each of the receiving members 90 is attached to a vertically movable block 94. The vertically movable block 94 is vertically movably held by a guide shaft 92 and a lead screw 93 supported vertically and in parallel with each other by a holder 91. When the lead screw 93 is driven in the forward or reverse direction by a motor 95, the receiving member 90 ascends or descends. The pair of bank note holding mechanisms 96*a* and 96*b* having the receiving members 90 are mounted on first and second horizontally movable blocks 98*a* and 98*b*, respectively. Each horizontally movable block 98*a* or 98*b* is supported by a pair of guide shafts 97 so as to be able to reciprocate along the bank note collecting direction in the bank note storage chamber 66. The first horizontally movable block 98*a* is coupled to the middle portion of a first timing belt 101. The first timing belt 101 is stretched between a driving pulley 99 and a driven pulley 100 that are disposed severally at both end portions of the guide shafts 97. The second horizontally movable block 98*b* is coupled to the middle portion of a second timing belt 103 which is stretched between a pair of driven pulleys 102 (only one shown) in parallel with the first timing belt 101. The driven pulley 100 and one of the driven pulleys 102 on which the first and second timing belts 101 and 103 are put are fixed to their corresponding ends of a rotating shaft 104 rotatably supported by a bearing device (not shown), and are linked together. When the driving pulley 99 is rotated in the forward or reverse direction, the first and second timing belts 101 and 103 are moved simultaneously at the same speed and in the same direction. Then, the first and second horizontally movable blocks 98*a* and 98*b* mounted with the bank note holding mechanisms 96*a* and 96*b* are caused to advance or retreat.

Between the respective conveyance paths of the first and second horizontally movable blocks 98*a* and 98*b* lies a third horizontally movable block 98*c* which is guided by a pair of guide shafts 106 in reciprocation. The third horizontally movable block 98*c* is mounted with a backup mechanism 107 including the backup member 72 to push the bank notes P in the bank note storage chamber 66 to the takeout side. In the backup mechanism 107, the backup member 72 is attached to a vertically movable block 111 which is vertically movably held by a guide shaft 109 and a lead screw 110 supported vertically and in parallel with each other by a holder 108. When the lead screw 110 is driven in the forward or reverse direction by a motor 112, the backup member 72 ascends or descends.

The third horizontally movable block 98*c* mounted with the backup mechanism 107 is coupled to the middle portion of a third timing belt 115. The third timing belt 115 is stretched between a driving pulley 113 and a driven pulley 114 that are disposed severally at both end portions of the guide shafts 106. The driven pulley 114 is rotatably mounted on the middle portion of the rotating shaft 104. When the driving pulley 113 is rotated in the forward or reverse direction by a motor 117, the third horizontally movable block 98*c* is caused to advance or retreat.

Figure 6A:
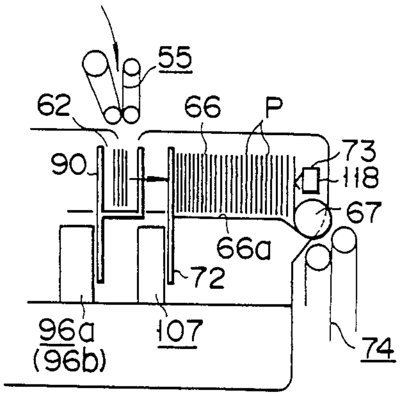
FIGS. 6A to 6F are schematic drawings collectively showing how to operate the transfer device.
Figure 6B:
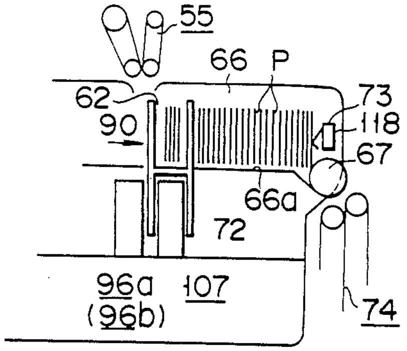

As shown in FIG. 6A, therefore, a pile of bank notes P fed by means of the delivery mechanism 55 are inserted into the pair of receiving members 90 forming the inlets 62 of the bank note holding mechanisms 96*a* and 96*b* which are previously located in their upper-limit positions. Thus, both end portions of the bank notes P are held by the receiving members 90. When the bank notes P are thus held by the pair of receiving members 90, the first and second horizontally movable blocks 98*a* and 98*b* mounted with the bank note holding mechanisms 96*a* and 96*b* advance simultaneously. Then, the bank note holding mechanisms 96*a* and 96*b* transfer the bank notes P held therein to the back side of the bank note storage chamber 66. At the same time, the forward-side end faces of the pair of receiving members 90 press on both shorter edge portions of the bank notes P stored in the bank note storage chamber 66, on the back side of the bank notes P, that is, on the side opposite to the takeout side. As the receiving members 90 press on the bank notes P stored in the bank note storage chamger 66, the accumulated pressure on the bank notes P increases to turn on a pressure detecting switch 118 beside the takeout pressure detecting switch 73. In response to such "on" operation, the motor 105, as the driving source for the first and second horizontally movable blocks 98*a* and 98*b* mounted with the bank note holding mechanisms 96*a* and 96*b*, stops.

Figure 6C:
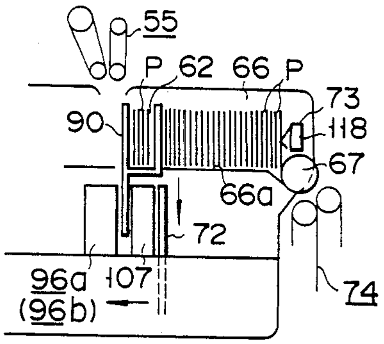
Figure 6D:
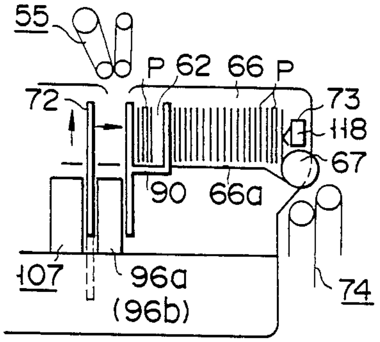

Then, the motor 112 for the backup mechanism 107 for backing up a pile of bank notes P in the bank note storage chamber 66 rotates in the reverse direction to lower the backup member 72. Thus, the backup member 72 is drawn in under a bank note receiving wall 66*a* of the bank note storage chamber 66, as shown in FIG. 6C. Then, the motor 117 as the driving source for the third horizontally movable block 98*c* mounted with the backup mechanism 107 rotates reversely for a given time. By such reverse rotation, the backup member 76 is caused to retreat and clear the bank notes P held by the pair of receiving members 90. Thereafter, the motor 112 rotates in the forward direction to raise the backup member 72, and thus the backup member 72 is opposed to the middle portion of the back side of the bank notes P held by the receiving members 90. At this time, the motor 105 rotates slightly in the reverse direction to cause the first and second horizontally movable blocks 98*a* and 98*b* mounted respectively with the bank note holding mechanisms 96*a* and 96*b* to retreat a little way. As a result, the pressure detecting switch 118 is turned off.

Subsequently, the backup member 72 advances to push the middle portion of the back of a pile of bank notes P that are held by the pair of receiving members 90 at either edge portion. Namely, a pile of bank notes P held by the receiving members 90 are pressed on the back side of the bank notes P stored in the bank note storage chamber 66. Accordingly, the pressure detecting switch 118 is turned on again, and the motor 117 is stopped to terminate the movement of the backup member 72.

Figure 6E:
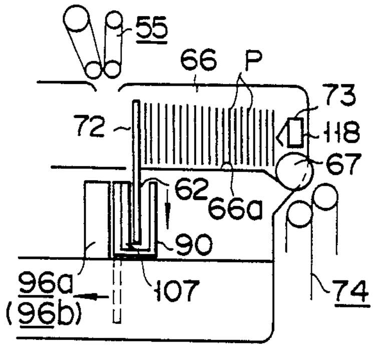
Figure 6F:
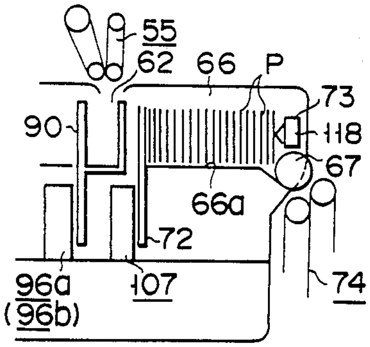

When the bank notes P held by the pair of receiving members 90 are thus pressed by the backup member 72, the motors 95 for the bank note holding mechanisms 96*a* and 96*b* rotate in the reverse direction to lower the pair of receiving members 90. As shown in FIG. 6E, therefore, the pair of receiving members 90 are drawn in under the bank note receiving wall 66*a* of the bank note storage chamber 66. Thereafter, the first and second horizontally movable blocks 98*a* and 98*b* are retreated by the reverse rotation of the motor 105, and the pair of receiving members 90 are caused to face the delivery mechanism 55. Then, in this position, the motors 95 rotate in the forward direction to raise the receiving members 90. Thus, the receiving members 90 stand ready to receive succeeding bank notes P to be deposited.

Thereafter, the backup member 72 is slightly retreated by a small reverse rotation of the motor 117. Then, the pressure detecting switch 118 is turned off.

Thus completed is the operation to transfer a pile of deposited bank notes P to the bank note storage chamber 66 for storing bank notes P for withdrawal.

The takeout pressure detecting switch is so designed as to be operated by a smaller pressure than the pressure necessary to operate the pressure detecting switch 118. Therefore, when the accumulated pressure on a pile of bank notes P inside the bank note storage chamber 66, that is, between the backup member 72 and the takeout roller 67, is below the optimum takeout pressure, the motor 117 is driven in the forward direction. When the accumulated pressure reaches the optimum takeout pressure, the motor 117 is stopped. Meanwhile, the backup member 72 is moved intermittently so as to correspond to the number of bank notes P taken out from the bank note storage chamber 66. Thus, the bank notes P can be taken out satisfactorily at all times.

Figure 7:
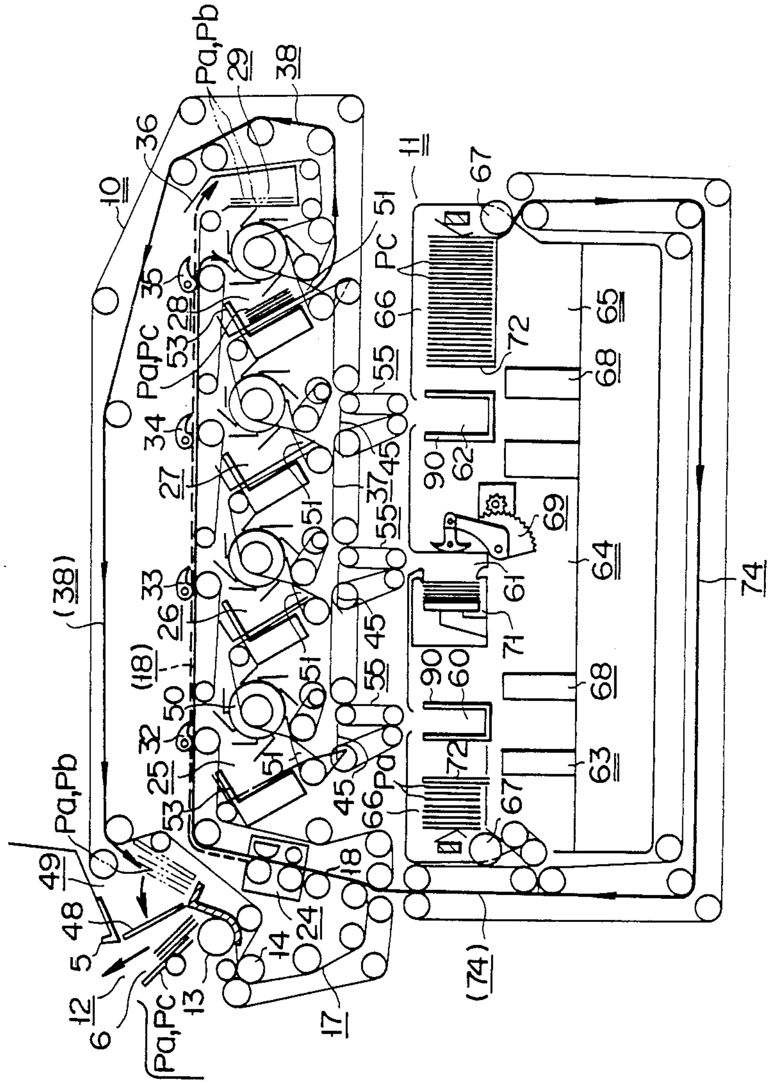
FIG. 7 is a partially broken, enlarged profile showing a mode of a withdrawal operation.

Now there will be described the operation of the automatic bank note transaction apparatus of the above-mentioned construction with reference to the drawings of FIGS. 7 to 10. Referring first to FIG. 7, the withdrawal operation will be described in detail. Let us suppose that bank notes P of two denominations, e.g., first-denomination notes Pa and third-denomination notes Pc, are used for withdrawal. In this case, the first- and third-denomination notes Pa and Pc are previously set in bundles in the bank note storage chambers 66 of the first and third safe sections 63 and 65, respectively. Here let it be supposed that we require the apparatus to deliver the bank notes Pa and Pc for 540 dollars (or 54 pounds). First, five third-denomination notes Pc are intermittently taken out from the safe unit section 11 by the agency of the takeout roller 67, fed into the supply-conveyance path 74, and thereby delivered into the first conveyance path 18 in the bank note processing section 10. The size and genuineness of the third-denomination notes Pc and the existence of superposed notes are examined by the bank note discriminator 24 in the middle of the first conveyance path 18. Those notes which are judged to be acceptable as a result of the examination are sorted out by the fourth distributing gate 35, and collected in the fourth temporary collecting section 28 by means of the impeller 50. If some of these third-denomination notes are rejected by the bank note discriminator 24, they are carried through the first conveyance path 18 and collected in the box 29. The remaining notes Pc, which are acceptable ones, are transferred to the fourth temporary collecting section 28. Then, the same number of new third-denomination notes as the rejected notes are taken out by the takeout roller 67 and examined by the bank note discriminator 24. If these new notes are all acceptable, they are transferred to the fourth temporary collecting section 28. Thus ends the taking of the third-denomination notes Pc. Subsequently, four first-denomination notes Pa are intermittently taken out from the bank note storage chamber 66 of the first safe section 63, and delivered into the bank note processing section 10 through the supply-conveyance path 74. Then, after going through the same processing for the third-denomination notes Pc, the first-denomination notes Pa are stacked and laid on the third-denomination notes Pc in the fourth temporaty collecting section 28.

Both shorter edges of the bank notes Pa and Pc equivalent to 540 dollars (or 54 pounds) thus stacked in the fourth temporary collecting section 28 are trued up by the line-up device 54 described in connection with FIGS. 3 and 4. Then, the gate 51 is opened as indicated by broken line in FIG. 7, and the depressing plate 53 is lowered to push out the bank notes Pa and Pc, which are then carried to the temporary receiving section 49 through the second conveyance path 38. Further, the bank notes Pa and Pc are delivered into the bank note receiving section 12 by the rocking motion of the movable plate 48. Thus, the cover 5 automatically slides open to urge the user to take out the bank notes Pa and Pc through the cash inlet/outlet slot 6. In FIG. 7, thick solid-lines and arrows represent the flows of accepted bank notes for withdrawal, and a thick broken-line and arrows represent the flow of rejected bank notes.

Figure 8:
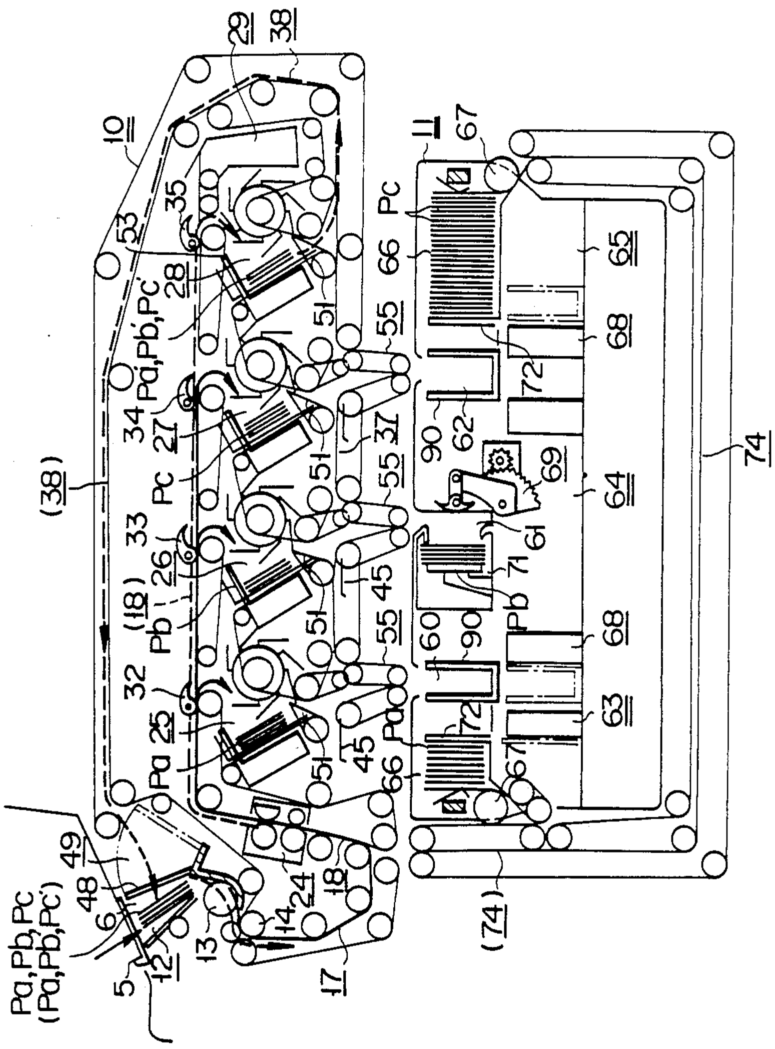
FIGS. 8 to 10 are partially broken, enlarged profiles showing modes of depositing operations, respectively.
Figure 9:
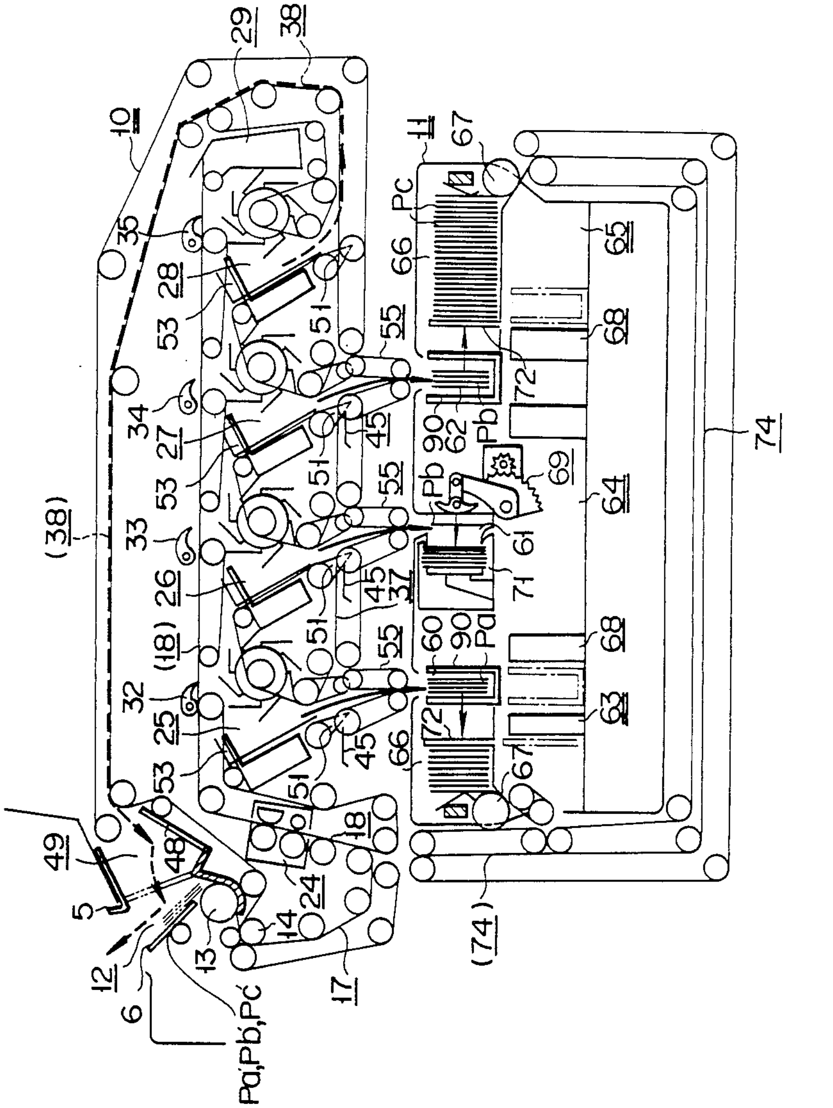
Figure 10:
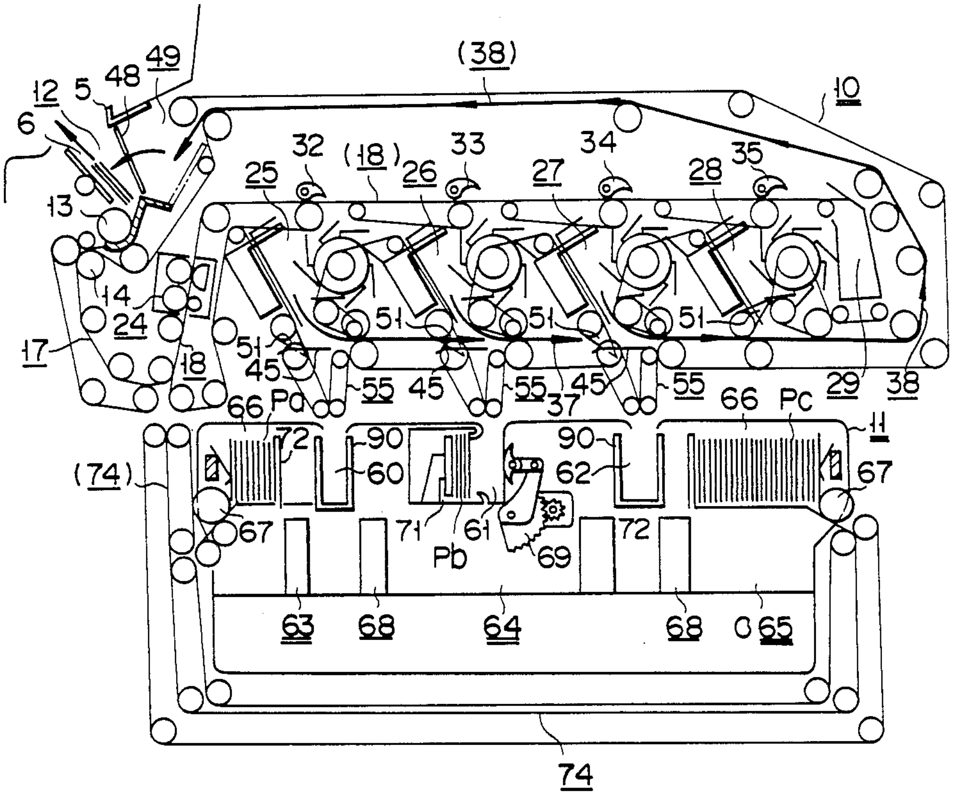

Referring then to FIGS. 8 to 10, the depositing operation will be described in detail. Let us suppose that bank notes P of four denominations, e.g., 1-dollar or 1-pound notes, 10-dollar or 5-pound notes, 50-dollar or 10-pound notes, and 100-dollar or 20-pound notes, are used for depositing. First, when the user operates in accordance with the operating instructions, the cover 5 automatically slides to open the cash inlet/outlet slot 6. Then, the user puts bank notes P collectively into the cash inlet/outlet slot 6, and manually slides the cover 5 to close the slot 6 as a signal for the end of bank note insertion. In response to the closing action, the introduction roller 13 rotates intermittently to introduce the inserted bank notes P in the bank note receiving section 12 one by one into the interior of the housing 1. The introduced bank notes P are delivered into the first conveyance path 18 serving also for withdrawal by way of the pair of transfer rollers 14 and the introduction conveyance path 17. Then, the genuineness and size of the bank notes P, the existence of superposed notes, etc., are examined by the bank note discriminator 24. Among the bank notes P judged to be fit or acceptable by the discriminator 24, 10-dollar or 1-pound notes are collected as the first-denomination notes Pa in the first temporary collecting section 25, 1-dollar or 5-pound notes and 50-dollar or 20-pound notes, which are used less frequently, are collected as the second-denomination notes Pb in the second temporary collecting section 26, and 100-dollar or 10-pound notes are collected as the third-denomination notes Pc in the third temporary collecting section 27. As for rejected bank notes Pa', Pb' and Pc', which may be deflected from their course or superposed at introduction, are sorted out by the distributing gates 32, 33, 34 and 35, respectively, and collected in the fourth temporary collecting section 28. The collected bank notes are arranged in order by the line-up device 54.

Like the aforementioned bank notes for withdrawal, the unfit notes Pa', Pb' and Pc' judged to be rejectable and collected in the fourth temporary collecting section 28 are delivered into the temporary receiving section 49 through the second conveyance path 38, and returned to the bank note receiving section 12. Thereafter, unlike the bank notes for withdrawal, the returned bank notes are introduced again one by one by the introduction roller 13, checked by the discriminator 24, and collected again according to denomination. In FIG. 8, thick solid-lines and arrows represent the flows of accepted bank notes for depositing, and a thick broken-line and arrows represent the flow of rejected bank notes for depositing.

Those bank notes Pa', Pb' and Pc' which are badly soiled, worn-out or of different kinds, and hence cannot be judged to be acceptable after repeated processing, are returned to the bank note receiving section 12. Then, the cover 5 automatically slides open to urge the user to take out and withdraw the rejected notes from the apparatus.

Subsequently, when the user approves the deposited amount and pushes the approval button 3*a*, the gates 51 at the respective outlets of the first, second and third temporary collecting sections 25, 26 and 27 are opened. Then, the depressing plates 53 descend to push out the first-, second- and third-denomination notes Pa, Pb and Pc in bundles from their corresponding temporary collecting sections 25, 26 and 27. The extruded bank notes Pa, Pb and Pc are delivered to the safe unit section 11 by their corresponding delivery mechanisms 55. Namely, the first-denomination notes Pa are collectively stored in the inlet 60 of the first safe section 63; the second-denomination notes Pb in the inlet 61 of the second safe section 64, and the third-denomination notes Pc in the inlet 62 of the third safe section 65. Then, the first- and third-denomination notes Pa and Pc are transferred to the bank note storage chambers 66 to be used for withdrawal by the transfer devices 68, respectively, described with reference to FIGS. 5 and 6. As for the second-denomination notes Pb, which are not available for withdrawal, they are delivered into the bank note storage chamber 71 by the push mechanism 69. Thus, all the processes of depositing operation are completed.

In FIG. 9, thick solid-lines and arrows represent the flows of bank notes to be stored in the safe unit section 11, and a thick broken-line and arrows represent the flow of bank notes to be returned.

On the other hand, if the user pushes the disapproval button 3*b* at the deposited amount checking in the middle of the depositing operation, the shutters 45 move to the position where they block up the inlets of the delivery mechanisms 55. Then, the gates 51 at the outlets of the first, second and third temporary collecting sections 25, 26 and 27 open successively. As a result, the bank notes Pa, Pb and Pc collected temporarily in the temporary collecting sections 25, 26 and 27 as aforesaid are delivered successively. The delivered bank notes are returned to the bank note receiving section 12 through the return path 37 and the second conveyance path 38. Then, the cover 5 slides open to urge the user to take out the bank notes, and thus the returning operation is completed.

In FIG. 10, thick solid-lines and arrows represent the flows of bank notes returned at the user's request.

In the depositing and withdrawing operations, both shorter edges of the bank notes P collected in the temporary collecting sections 25, 26, 27 and 28 are trued up by the line-up device 54. Accordingly, the bank notes P can securely be delivered, without jam or other trouble, into the bank note receiving section 12 and the respective inlets 60, 61 and 62 of the safe sections 63, 64 and 65 which are a little wider than the width of the bank notes P. Further, post-processing including reintroduction and storage of the bank notes P in the bank note storage chambers 66 and 71 may be ensured.

The safe unit section 11 at the lower interior portion of the housing 1 can be drawn out from both the front door side and the back door side as required. Therefore, the supply and withdrawal of bank notes P and other maintenance operations can be performed through the front or back side of the apparatus without regard to its setting style, whether outer-wall-type or lobby-type. Further, the top covers of the bank note storage chambers 66 and 71 are openable, so that the bank notes P can easily be supplied and withdrawn through the top side.

It is to be understood that this invention is not limited to the arrangement of the above-mentioned first embodiment, and that various changes and modifications may be effected therein by one skilled in the art without departing from the scope or spirit of the invention. Now further embodiments of the invention will be described with reference to FIGS. 11 to 16, in which like reference numerals refer to the same portions as those of the first embodiment throughout the several views.

Figure 11:
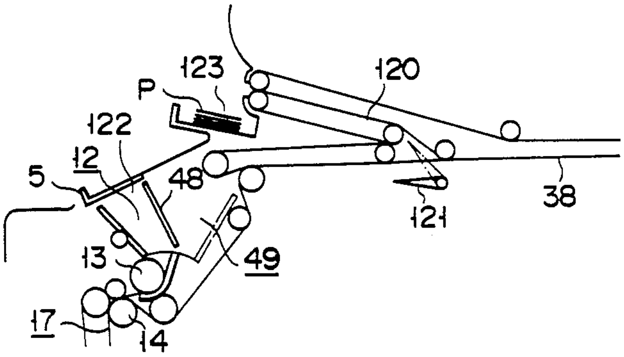
FIG. 11 is a schematic drawing of a second embodiment according to the present invention.

In the first embodiment, the cash inlet slot serves also as the cash outlet. As shown in FIG. 11 as a second embodiment, however, an exclusive-use conveyance path 120 for outlet extending to a separate cash outlet slot 123 may diverge from the second conveyance path 38 with a distributing gate 121 at the diverging point. Thus, bank notes P to be delivered for withdrawal and bank notes P to be returned at depositing may be selectively carried through the distributing gate 121 to the cash outlet slot 123 separate from a cash inlet slot 122. Such an arrangement will additionally facilitate the handling of bank notes P.

Figure 12:
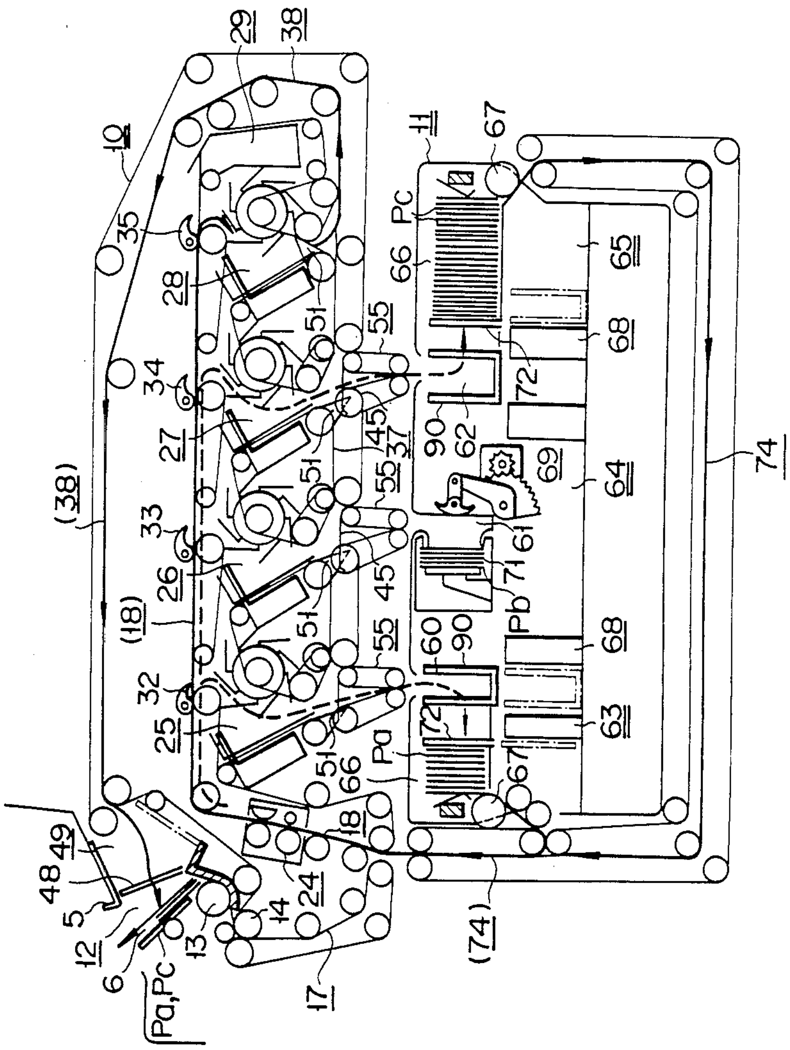
FIG. 12 is a partially broken, enlarged profile of a third embodiment according to the present invention.

In the first embodiment, moreover, the unfit notes Pa′ and Pc′ are collected in the collecting box 29 at withdrawal. As shown in FIG. 12 as a third embodiment, however, the unfit notes Pa′ and Pc′ may be transferred respectively to the bank note storage chambers 66 of the first and third safe sections 63 and 65 to be reused for withdrawal after they are collected temporarily in the temporary collecting sections 25 and 27. Thus, reserve bank notes Pa and Pc for withdrawal may be reduced in number.

Further, the bank note discriminator 24 may be followed by a bank note direction changer capable of selective operation so that the bank notes P may face in the same direction as they are delivered at withdrawal.

It is for the compactness of the apparatus that the first embodiment handles bank notes of four denominations for depositing and of only two denominations for withdrawal, with the transfer devices 68 (FIG. 5) limited in number. However, the apparatus of this invention may easily be adapted for use with more denominations by increasing the transfer devices 68.

In the first embodiment, moreover, bank notes for depositing and ones for withdrawal are examined by means of one and the same bank note discriminator 24. Alternatively, however, they may be examined by means of separate bank note discriminators.

Although in the first embodiment the fourth temporary collecting section 28 serves both as a collecting section for temporarily collecting fit notes at withdrawal and as a collecting section for temporarily collecting unfit notes at depositing, the invention is not limited to such an arrangement.

Figure 13:
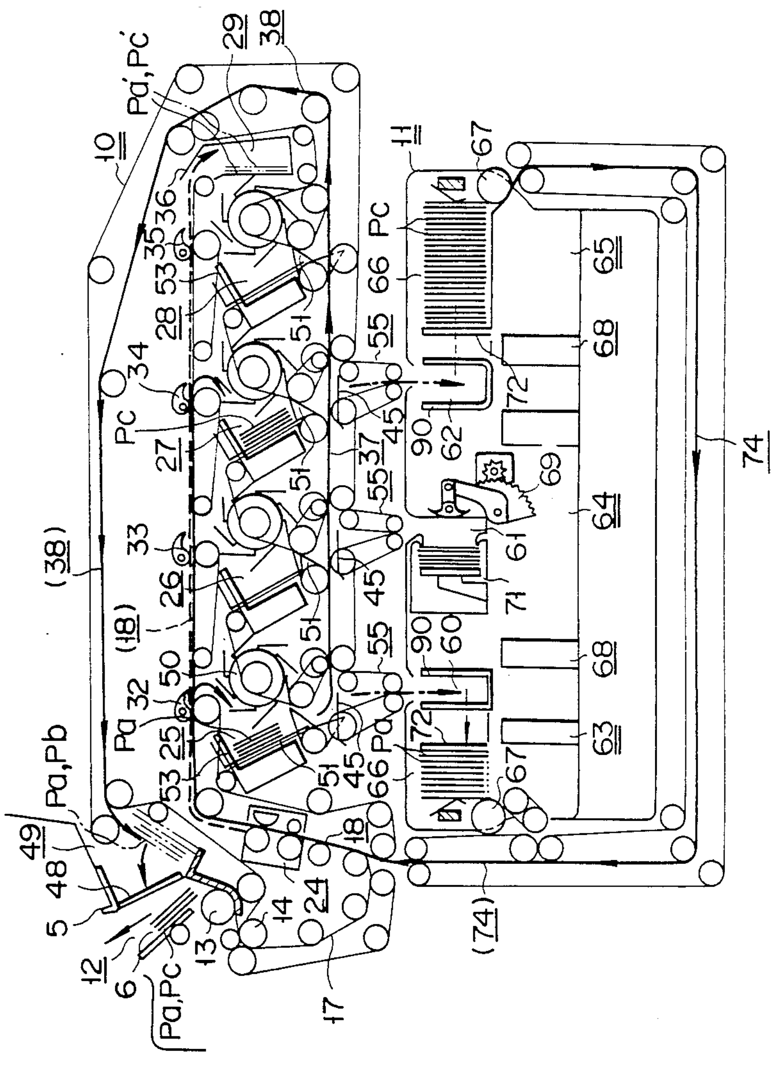
FIG. 13 is a partially broken, enlarged profile of a fourth embodiment according to the present invention.

For example, FIG. 13 shows a fourth embodiment, in which the size of first-denomination notes Pa and the existence of superposed notes are examined by the bank note discriminator 24 with the detecting sections 30 and 31 facing the middle portion of the first conveyance path 18. Those bank notes which are judged to be acceptable as a result of the examination are sorted out by the first distributing gate 32, and collected in the first temporary collecting section 25 by means of the impeller 50. If some of these first-denomination notes are rejected by the bank note discriminator 24, they are carried through the first conveyance path 18 and collected in the box 29. The remaining notes Pa, which are acceptable ones, are transferred to the first temporary collecting section 25. Then, the same number of new first-denomination notes as the rejected notes are taken out by the takeout roller 67 and examined by the bank note discriminator 24. If these new notes are all acceptable, they are transferred to the first temporary collecting section 25. Thus ends the taking of the first-denomination notes Pa. Subsequently, third-denomination notes Pc are intermittently taken out from the bank note storage chamber 66 of the third safe section 65, and delivered into the bank note processing section 10 through the supply-conveyance path 74. Then, after going through the same processing for the first-denomination notes Pa, the third-denomination notes Pc are collected in the third temporary collecting section 27 by way of the third distributing gate 34. If any first-denomination notes Pa (or third-denomination notes Pc) judged to be superposed are led into the temporary collecting section 25 (or 27) by mistake, then they will be once collected in the safe section 63 (or 65) and then taken out again.

Thereafter, both shorter edges of the bank notes Pa and Pc thus collected in the first and third temporary collecting sections 25 and 27 are trued up by the line-up device 54 of the first embodiment described in connection with FIGS. 3 and 4. Then, the gates 51 are opened as indicated by broken lines in FIG. 13, and the depressing plates 53 are lowered to push out the bank notes Pa and Pc. Then, the bank notes Pa and Pc are carried to the temporary receiving section 49 through the return path 37 and the second conveyance path 38. Further, the bank notes Pa and Pc are delivered into the bank note receiving section 12 by the rocking motion of the movable plate 48. Thus, the cover 5 automatically slides open to urge the user to take out the bank notes Pa and Pc through the cash inlet/outlet slot 6.

In FIG. 13, a solid-line and arrows represent the flows of accepted bank notes for withdrawal, and a broken-line and arrows represent the flow of rejected bank notes. Further, chain lines and arrows represent the flows of wrongly collected notes such as superposed notes.

Figure 14:
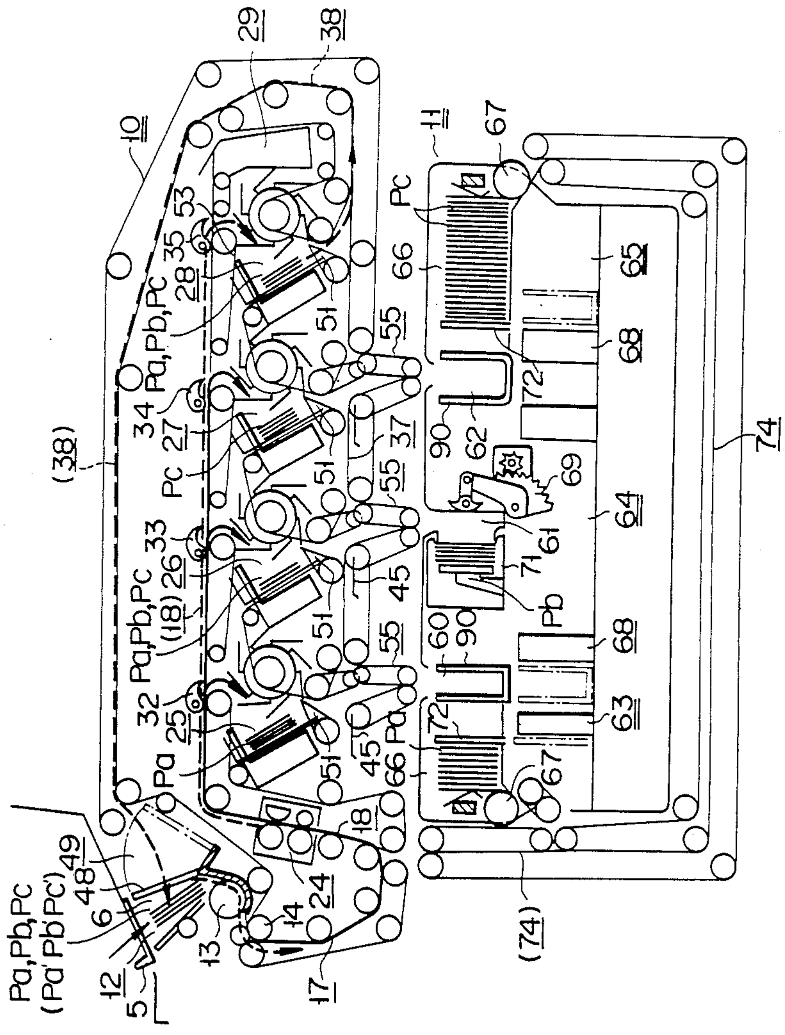
FIGS. 14 and 15 are partially broken, enlarged profiles of a fifth embodiment according to the present invention, respectively.
Figure 15:
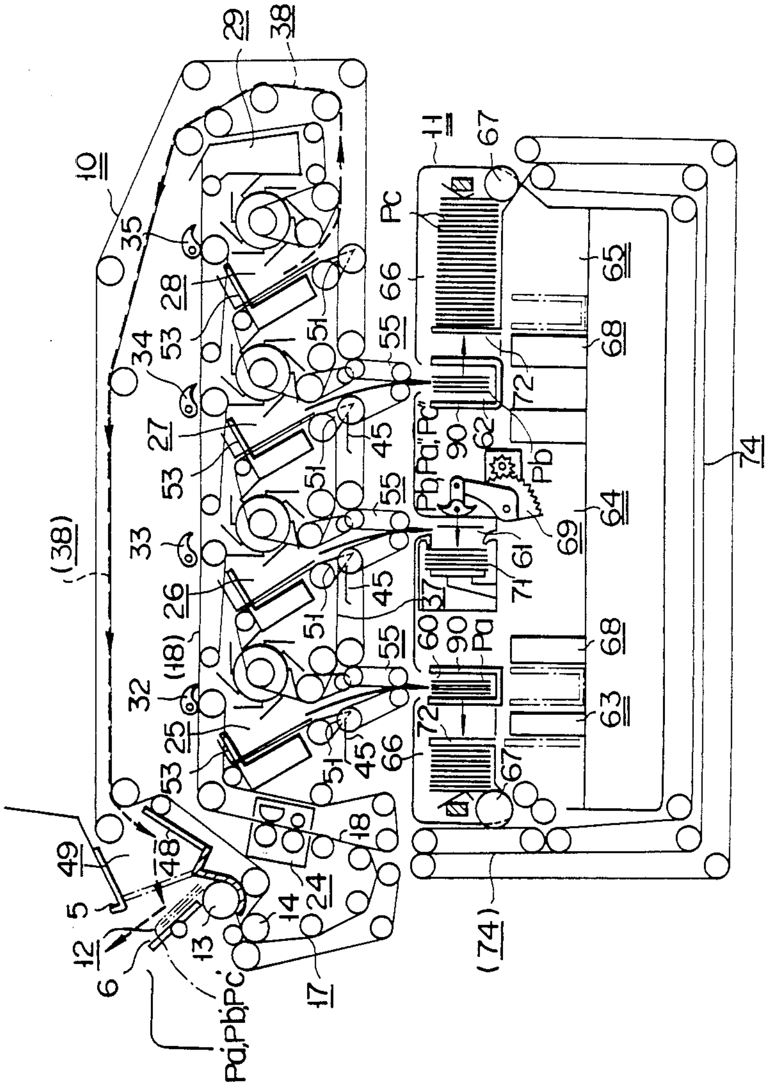

In the first embodiment, moreover, the bank note discriminator 24 discriminated only the genuineness of deposited bank notes P. Besides such true/false discrimination function, however, the discriminator 24 may have a reusable/non-reusable discrimination function, which enables such an arrangement as shown in FIGS. 14 and 15 as a fifth embodiment. In this embodiment, deposited bank notes P carried through the first conveyance path 17 are checked by the bank note discriminator 24 for genuineness, superposition, size, etc. Then, those first-denomination notes Pa which are judged to be true and fit as a result of the checking are sorted out by the first distributing gate 32, and collected in the first temporary collecting section 25. Second-denomination notes Pb and those first- and third-denomination notes Pa″ and Pc″ which are judged to be true but soiled, that is, judged to be unfit for reuse as bank notes for withdrawal (e.g., those which are badly soiled, broken, significantly dog-eared, etc.), are sorted out by the second distributing gate 33, and collected in the second temporary collecting section 26. As for third-denomination notes Pc, they are sorted out by the third distributing gate 34, and collected in the third temporary collecting section 27. Further, bank notes Pa', Pb' and Pc' as unfit notes, judged to be rejectable at discrimination because they are extremely deflected from their course or superposed at introduction, are sorted out by the fourth distributing gate 35, and collected in the fourth temporary collecting section 28. All those bank notes P are arranged in order by the line-up device 54.

The unfit notes Pa', Pb' and Pc' collected in the fourth temporary collecting section 28, like the aforementioned bank notes for withdrawal, are carried to the temporary receiving section 49 through the second conveyance path 38, and then returned to the bank note receiving section 12. Thereafter, unlike in the case of withdrawal, the returned notes are taken in again one by one by the introduction roller 13, and collected according to denomination.

In FIG. 14, a solid-line and arrows represent the flow of accepted bank notes for depositing, and a broken-line and arrows represent the flow of rejected bank notes for depositing.

Those bank notes Pa', Pb' and Pc' which are badly soiled, worn-out or of different kinds, and hence cannot be judged to be acceptable after repeated processing, are returned to the bank note receiving section 12. Then, the cover 5 automatically slides open to urge the user to take out and withdraw the rejected notes Pa, Pb' and Pc' from the apparatus.

Subsequently, when the user approves the deposited amount and pushes the approval button 3*a*, the gates 51 at the respective outlets of the first, second and third temporary collecting sections 25, 26 and 27 are opened. Then, the depressing plates 53 descend to push out the first-denomination notes Pa and Pa", the second-denomination notes Pb, and the third-denomination notes Pc and Pc" in bundles from their corresponding temporary collecting sections 25, 26 and 27. The extruded bank notes Pa, Pa", Pb, Pc and Pc" are delivered to the safe unit section 11 by their corresponding delivery mechanisms 55. Namely, the first-denomination notes Pa are collectively stored in the inlet 60 of the first safe section 63; the second-denomination notes Pb, as well as those first- and third-denomination notes Pa" and Pc" which are judged to be unfit for withdrawal, in the inlet 61 of the second safe section 64, and the third-denomination notes Pc in the inlet 62 of the third safe section 65. Then, the first- and third-denomination notes Pa and Pc are transferred to the bank note storage chambers 66 to be used for withdrawal by the transfer device 68 of the first embodiment described with reference to FIGS. 5 and 6. As for the second-denomination notes Pb, which are not available for withdrawal, and the first- and third-denomination notes Pa" and Pc" unfit for withdrawal, they are delivered into the bank note storage chamber 71 by the push mechanism 69. Thus, the depositing operation is completed.

In FIG. 15, solid-lines and arrows represent the flows of bank notes to be stored in the safe unit section 11, and a broken-line and arrows represent the flow of bank notes to be returned.

Figure 16:
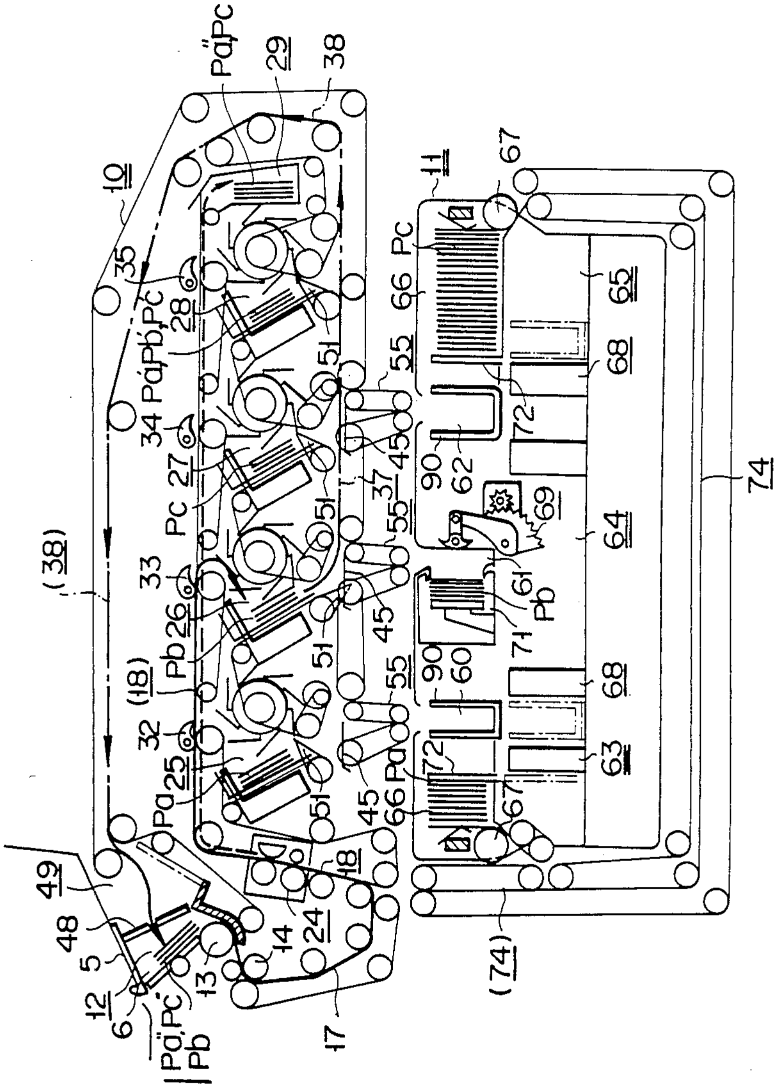
FIG. 16 is a partially broken, enlarged profile of a sixth embodiment according to the present invention.

In this fifth embodiment, those first- and third-denomination notes Pa" and Pc" as soiled notes which are judged to be unfit for withdrawal, among those bank notes which are judged to be acceptable by the bank note discriminator 24, are collected, together with the second-denomination notes Pb unavailable for withdrawal, in the bank note storage chamber 71 of the second safe section 64. Alternatively, however, the soiled notes Pa" and Pc" may be collected together in the collecting box 29 for collecting unfit notes for withdrawal, as shown in FIG. 16 as a sixth embodiment. In this case, first- and third-denomination notes Pa" and Pc" unfit for withdrawal, along with the second-denomination notes Pb, are once collected in the second temporary collecting section. When the approval button 3*a* is pushed, the bank notes Pa", Pc" and Pb collected in the second temporary collecting section 26 are once carried to the bank note receiving section 12 as indicated by a chain-line and arrows in FIG. 16, and thereafter introduced one by one for rechecking. Then, the second-denomination notes Pb are once collected again in the second temporary collecting section 26, as indicated by a solid-line and arrow. As for the first- and third-denomination notes Pa" and Pc" unfit for withdrawal, they are collected together in the collecting box 29 for collecting unfit notes for withdrawal.

What is claimed is:

1. An automatic bank note transaction apparatus comprising:

a housing including means for defining a cash inlet/-outlet port;

conveyance means for successively conveying bank notes received in said cash inlet/outlet port;

first temporary collecting means for temporarily collecting the deposited bank notes conveyed by said conveyance means;

a return path for returning the bank notes collected in said first temporary collecting means to said cash inlet/outlet port;

a storage means for storing bank notes for withdrawl;

control means manipulable by a user for selectively alternately producing indicia of deposit approval, deposit disapproval and request for withdrawl;

distributing means for guiding the bank notes temporarily collected in the first temporary collecting means into said storage means when said control means produces indicia of deposit approval and, alternately, into said return path when said control means produces indicia of deposit disapproval; and a withdrawl path for feeding the bank notes stored in said storage means to said cash inlet/outlet port when said control means produces said indicia of request for withdrawal, whereby the bank notes temporarily collected in said first temporary collecting means are returned to said cash inlet/outlet port via said return path in response to said indicia of deposit disapproval, and transferred to said storage means to be used as bank notes for withdrawal in response to said indicia of deposit approval, and the bank notes stored in the storage means are conveyed to said cash inlet/outlet port via said withdrawal path in response to said indicia of request for withdrawal.

2. The automatic bank notes transaction apparatus according to claim 1, wherein a part of said return path and a part of said withdrawal path have a common path.

3. The automatic bank note transaction apparatus according to claim 1, wherein deposited bank notes are used as bank notes for withdrawal.

4. The automatic bank note transaction apparatus according to claim 1, which further comprises second temporary collecting means for temporarily collecting the withdrawal notes, said second temporary collecting means including an inlet port and an outlet port.

5. The automatic bank note transaction apparatus according to claim 1, wherein said withdrawal path terminates at the inlet port of the second temporary collecting means.

6. The automatic bank note transaction apparatus according to claim 5, wherein said outlet port of the second temporary collecting means is connected to the return path.

7. The automatic bank note transaction apparatus according to claim 5, wherein a starting end of the return path is connected to the distributing means and a terminal end thereof terminates at the case inlet/outlet port.

8. The automatic bank note transaction apparatus according to claim 7, wherein said outlet port of the second temporary collecting means is connected to the midway portion of the return path.

9. An automatic bank note transaction system comprising:

cash inlet/outlet port means for accepting and discharging bank notes;

temporary collecting means for temporarily storing bank notes;

conveying means for successively conveying bank notes accepted by said port from said port over a deposit path to said temporary collecting means;

means for selectively alternately producing indicia of deposit approval and deposit disapproval in response to manipulation by a user;

means for selectively conveying bank notes from said temporary collecting means to said port over a return path different from said deposit path in response to said indicia of deposit disapproval;

storing means for storing bank notes; and means for selectively conveying bank notes from said temporary collecting means to said storing means in response to said indicia of deposit approval.

10. A system as in claim 9 wherein:

said indicia producing means further includes means for selectively producing indicia of request for withdrawal in response to manipulation by a user; and said system further includes means for conveying bank notes from said storing means to said port over a withdrawal path in response to said indicia of request for withdrawal.

11. A method comprising the steps of:

(1) accepting bank notes at a cash inlet/outlet port;

(2) successively conveying bank notes accepted by said accepting step (1) via a deposit path to a temporary collecting section;

(3) temporarily storing said bank notes conveyed by said conveying step (2) in said temporary collecting section;

(4) selectively alternately producing indicia of deposit approval and deposit disapproval in response to manipulation by a user;

(5) conveying bank notes from said temporary collecting section to said cash inlet/outlet port over a return path different from said deposit path in response to said indicia of deposit disapproval; and (6) conveying bank notes from said temporary collecting section to a storing section in response to said indicia of deposit approval.

12. A method as in claim 11 further including the steps of:

selectively producing indicia of request for withdrawal in response to manipulation by a user; and conveying bank notes from said storing section to said cash inlet/outlet port over a withdrawal path in response to said indicia of request for withdrawal.

* * * * *